US008600323B2

(12) United States Patent
Wu

(10) Patent No.: US 8,600,323 B2
(45) Date of Patent: Dec. 3, 2013

(54) METHOD, DEVICE, AND SYSTEM FOR SENDING REFERENCE SIGNALS

(75) Inventor: Yuchun Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/188,230

(22) Filed: Jul. 21, 2011

(65) Prior Publication Data

US 2011/0281537 A1  Nov. 17, 2011

Related U.S. Application Data

(63) Continuation of application No. PCT/CN2010/070154, filed on Jan. 13, 2010.

(30) Foreign Application Priority Data

Jan. 23, 2009 (CN) .......................... 2009 1 0001154
Apr. 27, 2009 (CN) .......................... 2009 1 0135721

(51) Int. Cl.
*H04B 1/04* (2006.01)
(52) U.S. Cl.
USPC .................. 455/129; 455/63.4; 455/562.1
(58) Field of Classification Search
USPC ............. 455/129, 63.4, 67.11, 562.1, 82, 83, 455/115.1, 115.2, 121, 575.7
See application file for complete search history.

(56) References Cited

U.S. PATENT DOCUMENTS

| | | | | |
|---|---|---|---|---|
| 5,684,794 A | * | 11/1997 | Lopez et al. .................. | 455/63.1 |
| 7,437,128 B1 | * | 10/2008 | Fessler et al. .............. | 455/67.13 |
| 2005/0095996 A1 | | 5/2005 | Takano | |
| 2010/0075705 A1 | * | 3/2010 | van Rensburg et al. ... | 455/67.11 |
| 2011/0081933 A1 | * | 4/2011 | Suh et al. ...................... | 455/509 |
| 2012/0088458 A1 | * | 4/2012 | Nogami et al. ............ | 455/67.11 |
| 2012/0281607 A1 | * | 11/2012 | Lindoff et al. ................ | 370/311 |
| 2012/0289175 A1 | * | 11/2012 | Vogas ........................ | 455/115.1 |

FOREIGN PATENT DOCUMENTS

| | | |
|---|---|---|
| CN | 1037399 A | 11/1989 |
| CN | 1385009 A | 12/2002 |
| CN | 1464667 A | 12/2003 |
| CN | 1614906 A | 5/2005 |
| CN | 101064546 A | 10/2007 |
| CN | 101296031 A | 10/2008 |
| CN | 101340227 A | 1/2009 |
| CN | 101340228 A | 1/2009 |
| CN | 101547036 A | 9/2009 |

(Continued)

OTHER PUBLICATIONS

International Search Report dated Apr. 22, 2010 in connection with International Patent Application No. PCT/CN2010/070154.

(Continued)

*Primary Examiner* — Lana N Le

(57) ABSTRACT

A method, a device, and a system for sending reference signals (RSs) are provided, which are capable of least modifying an original system and controlling the system overhead of the RSs. The method includes: grouping expanded transmitting antennas, wherein each group includes two transmitting antenna ports; and in two adjacent RS periods 2T, the RSs sent through the two transmitting antenna ports of each group are $[a*s1, b*s1*e^{jw}]$ respectively in a first period T and $[a*s2, -b*s2*e^{jw}]$ respectively in a second period T. The method, the device, and the system for sending RSs are applicable in design of transmitting antennas of an LTE Advanced system.

20 Claims, 2 Drawing Sheets

(56) References Cited

FOREIGN PATENT DOCUMENTS

| CN | 101729115 A | 6/2010 |
|---|---|---|
| EP | 0 339 242 A2 | 11/1989 |
| KR | 20080072486 A | 8/2008 |
| WO | WO 2010/048869 A1 | 6/2010 |

OTHER PUBLICATIONS

Written Opinion of the International Searching Authority dated Apr. 22, 2010 in connection with International Patent Application No. PCT/CN2010/070154.
Draft 3GPP TS 36.211 v8.45.0, "3rd Generation Partnership Project; Technical Specification Group Radio Access Network; Evolved Universal Terrestrial Radio Access (E-ULTRA); Physical Channels and Modulation (Release 8)", 2008, 84 pages.
3GPP TSG RAN1 #54bis, "Common Reference Symbol Mapping/Signaling for 8 Transmit Antennas", Sep. 28-Oct. 3, 2008, 6 pages.
3GPP TSG-RAN Working Group 1 Meeting #55bis, "Discussion on RS designs for CoMP in LTE-A", Jan. 12-16, 2009, 3 pages.
3GPP TSG RAN WG1 meeting #55bis, "RS design for DL higher order MIMO in LTE-A", Jan. 12-16, 2009, 4 pages.
3GPP TSG RAN WG1 Meeting #55bis, "Downlink Reference Signal for Higher Order MIMO", Jan. 12-17, 2009, 7 pages.
3GPP TSG RAN WG1 Meeting #55bis, "Considerations on DL MIMO for LTE-Advanced", Jan. 12-16, 2009, 3 pages.
3GPP TSG RAN WG1 Meeting #55bis, "CDM-based CRS structure for 8 transmit antennas", Jan. 12-16, 2009, 7 pages.
3GPP TSG RAN WG1 Meeting #55bis, "Common Refeence Symbol Mapping/Signaling for 8 Transmit Antenna", Jan. 12-16, 2009, 8 pages.
3GPP TSG RAN WG1 Meeting #55bis, "Support of DL Higher-Order MIMO Transmission in LTE-Advanced", Jan. 12-16, 2009, 9 pages.
3GPP TSG-RAN WG1 #55bis, "Aspects to consider for DL transmission schemes of LTE-A", Jan. 12-16, 2009, 3 pages.
3GPP TSG RAN WG1 Meeting #55, "Consideration on DL-MIMO in LTE-Advanced", Nov. 10-14, 2008, 4 pages.
3GPP TSG RAN WG1 Meeting #55, "Considerations on DL MIMO for LTE-Advanced", Nov. 10-14, 2008, 3 pages.
3GPP TSG RAN WG1 meeting #55, "Beamforming enhancement in LTE-Advanced", Nov. 10-14, 2008, 4 pages.
3GPP TSG-RAN WG1 #bis, "DL RS design for higher order MIMO", Jan. 12-16, 2009, 3 pages.
3GPP TSG RAN WG1 #55bis, "Discussions on DL RS Design for Higher Order MIMO", Jan. 12-16, 2009, 3 pages.
3GPP TSG-RAN Working Group 1 Meeting #55bis, "Design Aspect for Higher-order MIMO in LTE-advanved", Jan. 12-16, 2009, 8 pages.
3GPP TSG-RAN Working Group 1 Meeting #55b, "Discussion on Reference Signal Design for downlink MIMO in LTE-advanced", Jan. 12-16, 2009, 5 pages.

* cited by examiner

METHOD, DEVICE, AND SYSTEM FOR SENDING REFERENCE SIGNALS

CROSS-REFERENCE TO RELATED APPLICATIONS

This application is a continuation of International Application No. PCT/CN2010/070154, filed on Jan. 13, 2010, which claims priority to Chinese Patent Application No. 200910001154.1, filed on Jan. 23, 2009 and Chinese Patent Application No. 200910135721.2, filed on Apr. 27, 2009, all of which are hereby incorporated by reference in their entireties.

TECHNICAL FIELD

The present invention, relates to the field of communications technologies, and in particular, to a method, a device, and a system for sending reference signals (RSs).

BACKGROUND

In a communication system, RSs are mainly used to assist a receiving end in obtaining a channel estimation value $h_{i,j}$ ($h_{i,j}$ indicates a channel estimation value between a $j^{th}$ transmitting antenna and an $i^{th}$ receiving antenna) of each antenna port. Furthermore, RSs are also used for the receiving end to perform various measurements, such as, the Channel Quality Indicator (CQI) measurement and the Precoding Matrix Indicator (PMI) measurement. To facilitate the receiving end to perform channel estimation, when an antenna j ($1<=j<=M$, and M is a supported maximal number of transmitting antenna ports) sends RSs, no other antennas k ($k \ne j$) in the corresponding time-frequency resource send any signals.

Taking a Long Term Evolution (LTE) communication system of 3GPP as an example, the downlink transmission of the LTE communication system supports at most four antenna ports, and an average overhead occupied by the specific RSs of the corresponding cell is up to 14.3%. With the evolution of the communication system, the evolved system (referred to as an enhanced system, and the system before evolution is referred to as an original system) will be required to support more antenna ports, and a transmission device in the evolved system is required to be compatible with a receiving device in the original system.

For example, in an LTE Advanced system (enhanced system), the number of downlink transmitting antennas may be expanded to eight, so how to design RSs under the enhanced system so that the enhanced system can obtain gains from the added antennas and at the same time the enhanced system is compatible with the original system becomes an important problem to be solved necessarily.

Presently, there is a solution of simple expansion based on the original system, that is, eight antennas of the enhanced system send RSs on different time-frequency resources respectively. During the implementation of the present invention, the inventor found that the prior art at least has the following problems.

On one hand, an RS sequence of newly added four antenna ports needs to be designed, so large modification is made on the original system; and on the other hand, the system overhead of the RSs is increased.

SUMMARY

Embodiments of the present invention provide a method, a device, and system for sending RSs, which are capable of reducing the modification on an original system and meanwhile controlling the system overhead of the RSs.

An embodiment of the present invention provides a method for sending RSs after transmitting antenna expansion, where the method includes:

grouping expanded transmitting antennas, wherein each group includes two transmitting antenna ports; in two adjacent RS periods 2T, RSs sent by the two transmitting antenna ports of each group are $[a*s1, b*s1*e^{jw}]$ respectively in a first period T and $[a*s2, -b*s2*e^{jw}]$ respectively in a second period T, a and b are real numbers greater than or equal to 0, and s1 and s2 are RSs sent by the transmitting antenna before expansion in the first period T and the second period T respectively.

An embodiment of the present invention provides a device for sending RSs after transmitting antenna expansion, where the device includes:

a grouping unit, configured to group expanded transmitting antennas, wherein each group includes two transmitting antenna ports; and a sending unit, in which in two adjacent RS periods 2T, RSs sent by the two transmitting antenna ports of each group are $[a*s1, b*s1*e^{jw}]$ respectively in a first period T and $[a*s2, -b*s2*e^{jw}]$ respectively in a second period T, a and b are real numbers greater than or equal to 0, and s1 and s2 are RSs sent by the transmitting antenna before expansion in the first period T and the second period T respectively.

An embodiment of the present invention provides a system for sending RSs after transmitting antenna expansion, where the system includes a sending device and a receiving device, and the sending device includes:

a grouping unit, configured to group expanded transmitting antennas, wherein each group includes two transmitting antenna ports;

a sending unit, in which in two adjacent RS periods 2T, RSs sent by the two transmitting antenna ports of each group are $[a*s1, b*s1*e^{jw}]$ respectively in a first period T and $[a*s2, -b*s2*e^{jw}]$ respectively in a second period T, a and b are real numbers greater than or equal to 0, and s1 and s2 are RSs sent by the transmitting antenna before expansion in the first period T and the second period T respectively.

BRIEF DESCRIPTION OF THE DRAWINGS

To make the technical solutions under the present invention clearer, the accompanying drawings for illustrating the embodiments of the present invention or the prior art are outlined in the following. Apparently, the accompanying drawings are for the exemplary purpose only, and persons of ordinary skill in the art can derive other drawings from such accompanying drawings without any creative effort.

DETAILED DESCRIPTION

To make the objectives, technical solutions, and advantages of the present invention more comprehensible, the present invention is described in further detail below with reference to embodiments and the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
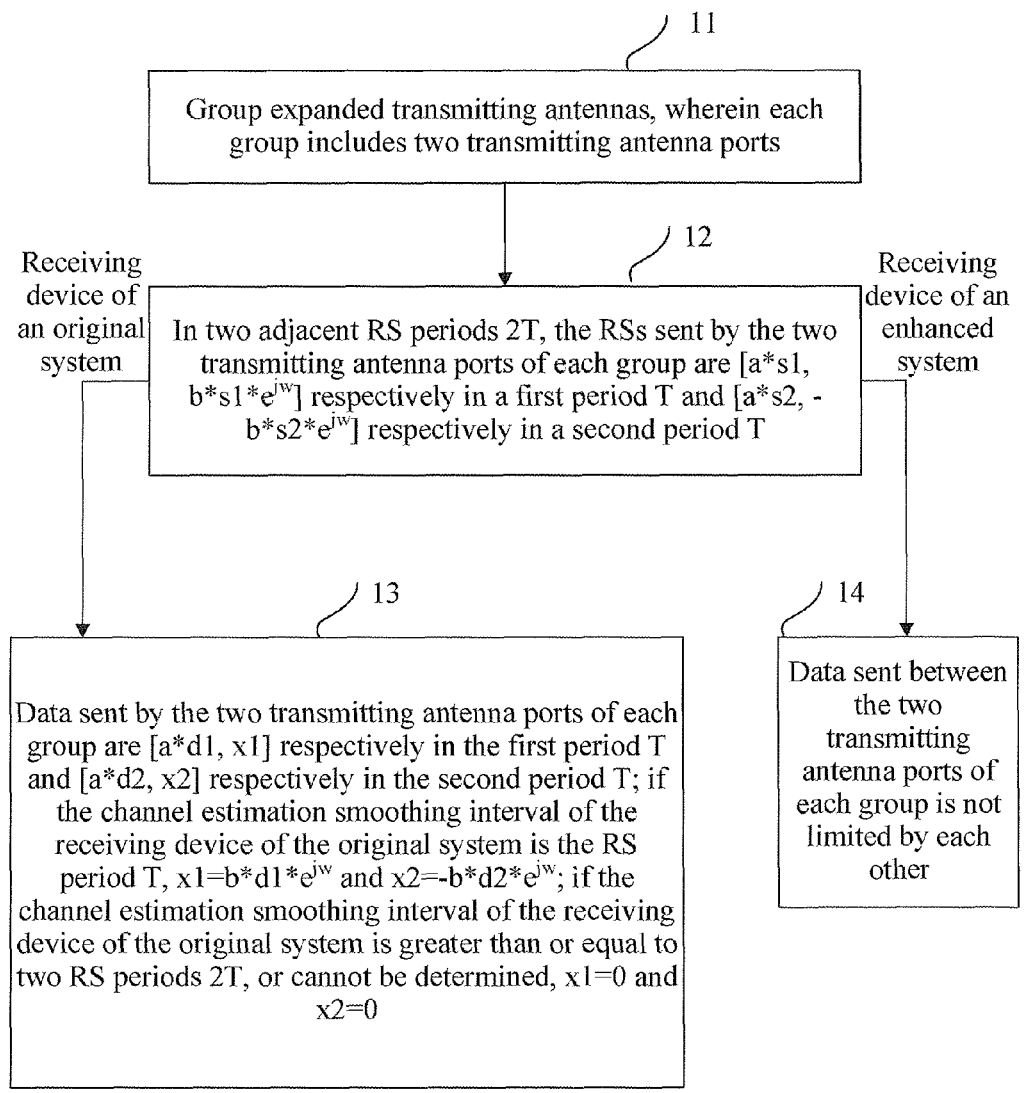
FIG. 1 is a schematic diagram of a method for sending RSs after transmitting antenna expansion according to an embodiment of the present invention.

Referring to FIG. 1, an embodiment of the present invention provides a method for sending RSs, in which the method includes the following steps.

Step 11: Group expanded transmitting antennas, wherein each group includes two transmitting antenna ports.

Step 12: In two adjacent RS periods 2T, RSs sent by the two transmitting antenna ports of each group are [a*s1, b*s1*$e^{jw}$] respectively in a first period T and [a*s2, −b*s2*$e^{jw}$] respectively in a second period T, a and b are real numbers greater than or equal to 0, and s1 and s2 are RSs sent by the transmitting antenna before expansion in the first period T and the second period T respectively.

In the method for sending RSs after transmitting antenna expansion, the expanded transmitting antennas are grouped, in which each group includes two transmitting antenna ports, in two adjacent RS periods 2T, the RSs sent by the two transmitting antenna ports of each group are [a*s1, b*s1*$e^{jw}$] respectively in the first period T and [a*s2, −b*s2*$e^{jw}$] respectively in the second period T, so that the RSs transmitted by the original antennas maintain unchanged or only simple power adjustment is performed, and the RSs transmitted by the newly added antennas are the same as those transmitted by the original antennas or only simple phase rotation and power adjustment are performed. Therefore, no new RS needs to be designed, so that the modification on the original system is reduced, and the system overhead of the RSs is controlled.

As for a receiving device of the original system, the method according to the embodiment of the present invention further includes the following step.

Step 13: Data sent by the two transmitting antenna ports of each group are [a*d1, x1] respectively in the first period T and [a*d2, x2] respectively in the second period T; and d1 and d2 are data sent by the transmitting antenna before expansion in the first period T and the second period T respectively.

If the channel estimation smoothing interval of the receiving device of the original system is the RS period T, x1=b*d1*$e^{jw}$ and x2=−b*d2*$e^{jw}$; if the channel estimation smoothing interval of the receiving device of the original system is greater than or equal to two RS periods 2T, x1=0 and x2=0; and if the channel estimation smoothing interval of the receiving device of the original system cannot be determined, x1=0 and x2=0.

As for a receiving device of an enhanced system, the method according to the embodiment of the present invention further includes the following step.

Step 14: Data sent between the two transmitting antenna ports of each group is not limited by each other.

That is to say, as for the receiving device of the enhanced system, the data sent by the two transmitting antenna ports of each group is [d1, d2] respectively in the first period T and [d3, d4] respectively in the second period T, in which d1 and d2, and d3 and d4 are not limited by each other.

It should be noted that, as for the two transmitting antennas in each group after grouping, the original antenna and the newly added antenna can be exchanged, for example, as for a communication channel between a base station (BS) and a mobile station (MS), when the channel quality corresponding to the newly added antenna is superior to that of the original antenna, the newly added antenna and the original antenna can be exchanged, thereby achieving better communication performance.

The situation of expanding four transmitting antenna ports to eight transmitting antenna ports is taken as an example for illustration.

Eight transmitting antenna ports are grouped into four groups, and the two antenna ports of each group are referred to as a group of transmitting antennas. For example, the first and the fifth antennas form the first group, the second and the sixth antennas form the second group, the third and the seventh antennas form the third group, and the fourth and the eighth antennas form the fourth group. Herein, merely the first group, that is, the first and the fifth antennas, is taken as an example for illustration, and the other groups of antennas can be correspondingly processed in the same mode.

It is assumed that channel factors corresponding to the two antennas to the $n^{th}$ receiving antenna port are respectively $h_{n,1}$ and $h_{n,5}$, and the RS period is T, in which 1<=n<=N, and N is a supported maximal number of receiving antenna ports, and then the following situations occur.

1) In the two adjacent periods 2T, the RSs sent by the two transmitting antenna ports of each group are [a*s1, b*s1*$e^{jw}$] respectively in the first period T and [a*s2, −b*s2*$e^{jw}$] respectively in the second period T, in which a and b are real numbers greater than or equal to 0, and s1 and s2 are RSs sent by the transmitting antenna before expansion in the first period T and the second period T respectively.

In other words, as for each group of transmitting antennas, the RSs transmitted by the original antennas maintain uncharged, or only simple power adjustment is performed, and the RSs transmitted by the newly added antennas are the same as those transmitted by the original antennas, or only simple phase rotation and power adjustment are performed.

2) As for the receiving device of the original system, the data sent by the two transmitting antenna ports of each group is [a*d1, x1] respectively in the first period T and [a*d2, x2] respectively in the second period T, in which d1 and d2 are data sent by the transmitting antenna before expansion in the first period T and the second period T respectively.

According to the channel estimation smoothing interval of the receiving device of the original system, the x1 and x2 further determined are as follows.

If the channel estimation smoothing interval of the receiving device of the original system is T, x1=b*d1*$e^{jw}$ and x2=−b*d2*$e^{jw}$, that is, the newly added antenna ports send the data at the same phase rotation angle and power ratio as those of the RSs, so as to ensure the backward compatibility of the system after transmitting antenna expansion.

If the channel estimation smoothing interval of the receiving device of the original system>=2T, or the channel estimation smoothing interval of the receiving device of the original system cannot be determined, x1=0 and x2=0, that is, the newly added antenna ports do not send the data, so as to ensure the compatibility with the original system after transmitting antenna expansion.

3) As for the receiving device of the enhanced system, the data sent by the two transmitting antenna ports of each group is [d1, d2] respectively in the first period T and [d3, d4] respectively in the second period T, in which d1 and d2, and d3 and d4 are not limited by each other, that is, the data sent between the two transmitting antenna ports of each group is not limited by each other.

It can be understood that, when the channel quality of the newly added antenna is superior to that of the original antenna, the antenna 1 and the antenna 5 can be exchanged, so as to achieve better communication performance, and the similar transmission mode is adopted for processing. The technical solution according to the embodiments of the present invention can effectively solve the following problems.

1) As the RSs transmitted by the original antennas maintain unchanged or only simple power adjustment is performed, the RSs transmitted by the newly added antennas are the same as those transmitted by the original antennas, or only simple phase rotation and power adjustment are performed. Therefore, the RSs of the two transmitting antennas after grouping occupy the same time-frequency resource, so the system overhead of the RSs can be controlled.

2) As for the receiving device of the original system, it is assumed that the influence of noises is not considered.

In a first situation, if the channel estimation smoothing interval of the receiving device of the original system is T, in the first period T of the two consecutive periods, the received RSs are $s1*(a*h_{n,1}+b*h_{n,5}*e^{jw})$ the channel estimation values are $(a*h_{n,1}+b*h_{n,5}*e^{jw})$, and the demodulation result is $d1*(a*h_{n,1}+b*h_{n,5}*e^{jw})*(a*h_{n,1}+b*h_{n,5}*e^{jw})'=d1*|(a*h_{n,1}+b*h_{n,5}*e^{jw})|^2$; and in the second period T, the received RSs are $s2*(a*h_{n,1}-b*h_{n,5}*e^{jw})$, the channel estimation values are $(a*h_{n,1}-b*h_{n,5}*e^{jw})$ and the demodulation result is $d2*(a*h_{n,1}-b*h_{n,5}*e^{jw})*(a*h_{n,1}-b*h_{n,5}*e^{jw})'=d2*|(a*h_{n,1}-b*h_{n,5}*e^{jw})|^2$, in which x' indicates a conjugation of x, and $s_i$ and $h_{i,j}$ in the formulas are complex numbers. $|(a*h_{n,1}+b*h_{n,5}*e^{jw})|^2$ or $|(a*h_{n,1}-b*h_{n,5}*e^{jw})|^2$ is a positive real number, which is beneficial to correct demodulation, so gains brought by the two transmitting antennas are obtained.

In a second situation, if the channel estimation smoothing interval of the receiving device of the original system>=2T, it is assumed the receiving device is smoothed to obtain the channel estimation value in two consecutive periods, and the channel estimation value after smoothing is: $[(a*h_{n,1}+b*h_{n,5}*e^{jw})+(a*h_{n,1}-b*h_{n,5}*e^{jw})]/2=a*h_{n,1}$; in the first period T, the demodulation result is $(a*d1*h_{n,1}+0*b*h_{n,5}*e^{jw})*(a*h_{n,1})'=d1*|a*h_{n,1}|^2$; and in the second period T, the demodulation result is $(a*d2*h_{n,1}+0*b*h_{n,5}*e^{jw})*(a*h_{n,1})'=d2*|a*h_{n,1}|^2$. The newly added antenna ports in the group of transmitting antennas do not send data in the two periods 2T, so no gain is brought due to the increase of the transmitting antennas. However, because the channel estimation is obtained through averaging in two periods 2T, the channel estimation is more accurate than that obtained in the single period T, which is beneficial to correct demodulation, and therefore gains are brought to the performance of the whole system.

In a third situation, when the channel estimation smoothing interval of the receiving device of the original system cannot be determined, if the channel estimation smoothing interval of the receiving device of the original system>=2T, which is equivalent to the analysis in the second situation, as the analysis above, the receiving device can perform correct demodulation, and gains to the performance of the whole system are obtained. If the channel estimation smoothing interval of the receiving device of the original system is T, the demodulation performance at this time is analyzed as follows.

In the first period T, the received RSs are $s1*[a*h_{n,1}+b*h_{n,5}*e^{jw}]$, the channel estimation values are $[a*h_{n,1}+b*h_{n,5}*e^{jw}]$, and the demodulation result is $d1*[a*h_{n,1}+0*b*h_{n,5}*e^{jw}]*[a*h_{n,1}+b*h_{n,5}*e^{jw}]'=d1*|a*h_{n,1}|^2+d1*a*h_{n,1}*[b*h_{n,5}*e^{jw}]'$, in which a first part $d1*|a*h_{n,1}|^2$ is useful signal demodulation values, and a second part $d1*a*h_{n,1}*[b*h_{n,5}*e^{jw}]'$ is interference. In the second period T, the received RSs are $s1*[a*h_{n,1}-b*h_{n,5}*e^{jw}]$, the channel estimation values are $[a*h_{n,1}-b*h_{n,5}*e^{jw}]$, and the demodulation result is $d1*[a*h_{n,1}+0*b*h_{n,5}*e^{jw}]*[a*h_{n,1}-b*h_{n,5}*e^{jw}]'=d1*|a*h_{n,1}|^2-d1*a*h_{n,1}*[b*h_{n,5}*e^{jw}]'$, in which a first part $d1*|a*h_{n,1}|^2$ is useful signal demodulation values, and a second part $-d1*a*h_{n,1}*[b*h_{n,5}*e^{jw}]'$ is interference. It is assumed that the amplitude values of $h_{n,1}$ and $h_{n,5}$ are equal in statistics, the Signal Interference Ratio (SIR) is a/b, which is just the ratio of the power of the RSs of the antenna 1 to that of the RSs of the antenna 5, so a suitable SIR can be obtained by properly adjusting the power ratio. Therefore, as for the receiving device of the original system, the backward compatibility is ensured after transmitting antenna expansion, and at the same time, the receiving gains of the original system can also be improved.

3) As for the receiving device of the enhanced system, it is assumed that the influence of noises is not considered, and only simultaneous equations: $s1*(a*h_{n,1}+b*h_{n,5}*e^{jw})=r1$, $s2*(a*h_{n,1}-b*h_{n,5}*e^{jw})=r2$ need to be solved, in which s1, s2, r1, r2, w, a, and b are known for the receiving device, and only $h_{n,1}$ and $h_{n,5}$ are unknown, so that the channel estimation values $h_{n,1}$ and $h_{n,5}$ of the two antennas of each group can be obtained in the two consecutive periods 2T, and the gains after transmitting antenna expansion can be obtained with the data obtained through demodulating the obtained channel estimation values.

4) Few modifications are made on the design of the original system, the RSs and data signals transmitted by the original M antennas maintain unchanged or only simple power adjustment is performed. Optionally, when a=b=1, and the RSs and data signals transmitted by the original M antennas maintain unchanged, the RSs transmitted by the newly added M antennas are the same as those transmitted by the original M antennas, or only simple phase rotation is performed; or optionally, when $a^2+b^2=1$, the sum of the power of the RSs transmitted by the original M antennas and that of the RSs transmitted by the newly added M antennas is the same as that of the original system. In the simplest situation, $e^{jw}=1$ or $-1$, that is, only the RSs are reversed without designing new RSs.

As for an LTE system and an LTE Advanced system, the minimal time-frequency resource occupied by the data sent to each terminal by the BS is a resource block (RB) of two slots in one sub-frame, that is, the time of 1 ms includes two slots, and the BS generally needs to smooth two slots to obtain the channel estimation value. Therefore, in order to ensure the backward compatibility of the system, the newly added transmitting antenna port may choose not to send signals, and preferably, $e^{jw}=1$ or $-1$.

1) The period T of the RSs is one slot=0.5 ms.

2) In two adjacent periods 2T, the RSs sent by the two transmitting antenna ports in each group among the four groups of antennas are [a*s1, b*s1] respectively in the first period T and [a*s2, -b*s2] respectively in the second period T; or the sent RSs are [a*s1, -b*s1] respectively in the first period T and [a*s2, b*s2] respectively in the second period T.

3) As for a terminal receiver of the LTE system, the data sent by the two transmitting antenna ports in each group among the four groups of antennas is [a*d1, 0] respectively in the first period T and [a*d2, 0] respectively in the second period T, that is, the newly added transmitting antenna ports in each group among the four groups of antennas do not send the data in two periods 2T, so as to ensure the backward compatibility of the system after antenna port expansion.

It can be understood that, when the channel quality of the newly added antennas is superior to that of the original antennas, to achieve better communication performance, the original antennas and the newly added antennas are exchanged, only the newly added antennas send the data in the two periods 2T, and the original antennas do not send the data, which can also ensure the backward compatibility of the system after antenna port expansion.

4) As for a terminal receiver of the LTE Advanced system, the newly added transmitting antenna ports and the original transmitting antenna ports send the data respectively, so as to obtain the gains of the system after the transmitting antenna ports are newly added.

Figure 2:
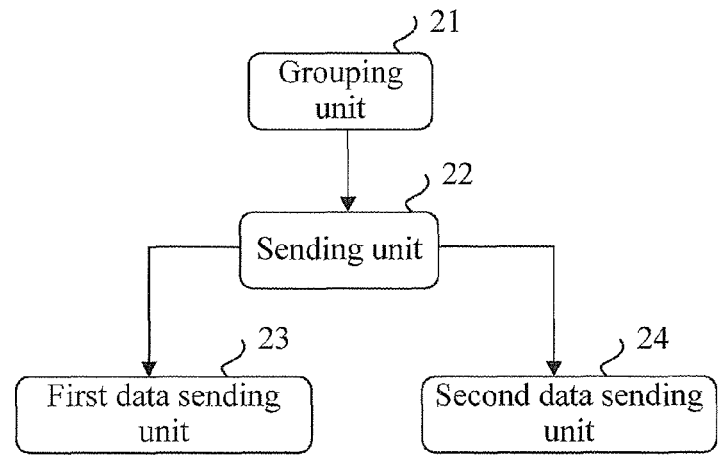
FIG. 2 is a schematic structural diagram of a device for sending RSs after transmitting antenna expansion according to an embodiment of the present invention.

Referring to FIG. 2, an embodiment of the present invention provides a device for sending RSs after transmitting antenna expansion, in which the device includes:

a grouping unit 21, configured to group expanded transmitting antennas, wherein each group includes two transmitting antenna ports; and a sending unit 22, configured to in two adjacent RS periods 2T, send the RSs by the two transmitting antenna ports of each group. The RSs sent are [$a*s1$, $b*s1*e^{jw}$] respectively in a first period T and [$a*s2$, $-b*s2*e^{jw}$] respectively in a second period T, a and b are real numbers greater than or equal to 0, and s1 and s2 are RSs sent by the transmitting antenna before expansion in the first period T and the second period T respectively.

The values of a and b are determined by the ratio of the power of the RSs of the original antennas to that of the RSs of the newly added antennas, optionally, when a=b=1, and the RSs and data signals transmitted by the original M antennas maintain unchanged, the RSs transmitted by the newly added M antennas are the same as those transmitted by the original M antennas, or only simple phase rotation is performed; or optionally, when $a^2+b^2=1$, the sum of the power of the RSs transmitted by the original M antennas and that of the RSs transmitted by the newly added M antennas is the same as that of the original system.

Preferably, $e^{jw}=1$ or $-1$, that is, only the RSs are reversed without designing new RSs.

As for a receiving device of an original system, the sending device further includes:

a first data sending unit 23, configured to send the data by the two transmitting antenna ports of each group. The data sent is [$a*d1$, x1] respectively in the first period T and [$a*d2$, x2] respectively in the second period T; and d1 and d2 are data sent by the transmitting antenna before expansion in the first period T and the second period T respectively; if the channel estimation smoothing interval of the receiving device of the original system is the RS period T, $x1=b*d1*e^{jw}$ and $x2=-b*d2*e^{jw}$; if the channel estimation smoothing interval of the receiving device of the original system is greater than or equal to two RS periods 2T, or the channel estimation smoothing interval of the receiving device of the original system cannot be determined, x1=0 and x2=0.

As for a receiving device of an enhanced system, the sending device further includes:

a second data sending unit 24, configured to send the data between the two transmitting antenna ports of each group. The data sent is not limited by each other.

Taking the situation of expanding four transmitting antenna ports of the LTE system to eight transmitting antenna ports of the LTE Advanced system as an example, the BS generally needs to smooth two slots (each slot=0.5 ms) to obtain the channel estimation value. Therefore, as for the receiving device of the original system, in the first data sending unit 23, x1=0 and x2=0, that is, to ensure the backward compatibility of the system after transmitting antenna expansion, the newly added antenna ports choose not to send data.

The sending device according to the embodiment of the present invention can effectively solve the following problems.

1) Because the RSs of the two transmitting antennas after grouping occupy the same time-frequency resource, the system overhead of the RSs can be controlled.

2) As for the receiving device of the original system, the backward compatibility after transmitting antenna expansion is ensured, and the receiving gains of the original system can be improved as well.

3) As for the receiving device of the enhanced system, the gains after transmitting antenna expansion can be obtained.

4) Few modifications are made on the design of the original system, so that the RSs transmitted by the original antennas maintain unchanged or only simple power adjustment is performed, and the RSs transmitted by the newly added antennas are the same as those transmitted by the original antennas or only simple phase rotation and power adjustment are performed. Therefore, no new RS needs to be designed.

More details may be obtained with reference to the method embodiments of the present invention, which will not be repeated herein.

Figure 3:
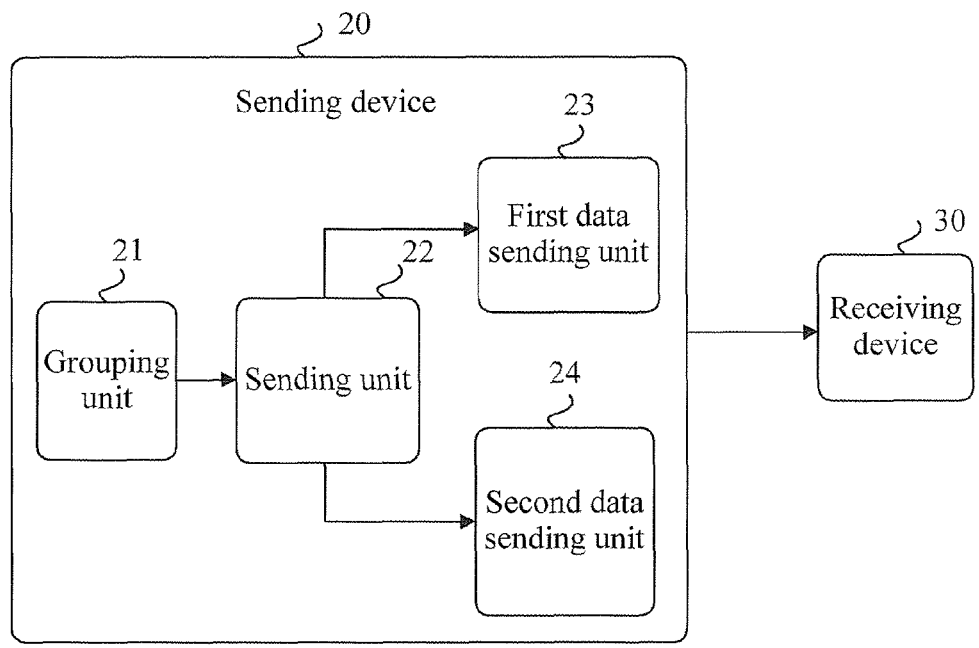
FIG. 3 is a schematic structural diagram of a system for sending RSs after transmitting antenna expansion according to an embodiment of the present invention.

Referring to FIG. 3, an embodiment of the present invention provides a system for sending RSs after transmitting antenna expansion, in which the system includes a sending device 20 and a receiving device 30, and the sending device 20 includes:

a grouping unit 21, configured to group expanded transmitting antennas, in which each group includes two transmitting antenna ports; and a sending unit 22, configured to in two adjacent RS periods 2T, send the RSs by the two transmitting antenna ports of each group. The RSs sent are [$a*s1$, $b*s1*e^{jw}$] respectively in a first period T and [$a*s2$, $-b*s2*e^{jw}$] respectively in a second period T, a and b are real numbers greater than or equal to 0, and s1 and s2 are RSs sent by the transmitting antenna before expansion in the first period T and the second period T respectively.

Optionally, when a=b=1 and the RSs and data signals transmitted by the original M antennas maintain unchanged, the RSs transmitted by the newly added M antennas are the same as those transmitted by the original M antennas, or only simple phase rotation is performed; or optionally, when $a^2+b^2=1$, the sum of the power of the RSs transmitted by the original M antennas and that of the RSs transmitted by the newly added M antennas is the same as that of the original system.

Preferably, $e^{jw}=1$ or $-1$, that is, only the RSs are reversed without designing new RSs.

As for a receiving device 30 of the original system, the sending device 20 further includes:

a first data sending unit 23, configured to send the data by the two transmitting antenna ports of each group. The data sent is [$a*d1$, x1] respectively in the first period T and [$a*d2$, x2] respective in the second period T; d1 and d2 are data sent by the transmitting antenna before expansion in the first period T and the second period T respectively; if the channel estimation smoothing interval of the receiving device 30 of the original system is the RS period T, $x1=b*d1*e^{jw}$ and $x2=-b*d2*e^{jw}$; if the channel estimation smoothing interval of the receiving device 30 of the original system is greater than or equal to two RS periods 2T, or the channel estimation smoothing interval of the receiving device 30 of the original system cannot be determined, x1=0 and x2=0.

As for a receiving device 30 of the enhanced system, the sending device 20 further includes:

a second data sending unit 24, configured to send the data between the two transmitting antenna ports of each group. The data sent is not limited by each other.

The sending system according to the embodiment of the present invention can effectively solve the following problems.

1) Because the RSs of the two transmitting antennas after grouping occupy the same time-frequency resource, the system overhead of the RSs can be controlled.

2) As for the receiving device of the original system, the backward compatibility after transmitting antenna expansion is ensured, and the receiving gains of the original system can be improved as well.

3) As for the receiving device of the enhanced system, the gains after transmitting antenna expansion can be obtained.

4) Few modifications are made on the design of the original system, so that the RSs transmitted by the original antennas maintain unchanged or only simple power adjustment is performed, and the RSs transmitted by the newly added antennas are the same as those transmitted by the original antennas or only simple phase rotation and power adjustment are performed. Therefore, no new RS needs to be designed.

Specific descriptions of principles may be obtained with reference to the method embodiments of the present invention, which will not be repeated herein.

Finally, it should be: noted that, persons of ordinary skill in the art should understand that all or a part of the steps in the method according to the embodiments of the present invention can be implemented by a program instructing relevant hardware, and the program may be stored in a computer readable storage medium. When the program is run, steps of the method according to the embodiment of the present invention are performed. The storage medium may be a magnetic disk, an optical disk, a read-only memory (ROM), a random access memory (RAM), and the like.

Various functional units according to the embodiments of the present invention may be integrated in one processing module or may exist as various separate physical units, or two or more units may be integrated in one module. The integrated module maybe implemented through hardware, or may also be implemented in a form of a software functional module. When the integrated module is implemented in the form of the software functional module and sold or used as a separate product, the integrated module may be stored in a computer readable storage medium. The storage medium may be a ROM, a magnetic disk, an optical disk, or the like.

The method, the device, and the system for sending RSs after transmitting antenna expansion according to the embodiments of the present invention are described in detail above. The description about the embodiments of the present invention is merely provided for ease of understanding of the method and core ideas of the present invention. Variations and modifications made by persons of ordinary skill in the art within the technical scope disclosed by the present invention should fall within the protection scope of the present invention.

What is claimed is:

1. A method for sending reference signals (RSs) after transmitting antenna expansion, the comprising:
grouping expanded transmitting antennas, wherein each group comprises two transmitting antenna ports; and
sending RSs in two adjacent RS periods 2T, wherein the RSs sent by the two transmitting antenna ports of the each group are $[a*s1, b*s1*e^{jw}]$ respectively in a first period T and $[a*s2, -b*s2*e^{jw}]$ respectively in a second period T, a and b are real numbers greater than or equal to 0, and s1 and s2 are RSs sent by a transmitting antenna before expansion in the first period T and the second period T respectively.

2. The method according to claim 1, wherein:
for a receiving device of an original system after expansion, data sent through the two transmitting antenna ports of the each group is $[a*d1, x1]$ respectively in the first period T and $[a*d2, x2]$ in the second period T, wherein d1 and d2 are data sent by the transmitting antenna before expansion in the first period T and the second period T respectively.

3. The method according to claim 2, wherein:
if a channel estimation smoothing interval of the receiving device is the RS period T, $x1=b*d1*e^{jw}$ and $x2=-b*d2*e^{jw}$.

4. The method according to claim 2, wherein:
if a channel estimation smoothing interval of the receiving device is greater than or equal to the two RS periods 2T, $x1=0$ and $x2=0$.

5. The method according to claim 2, wherein:
if a channel estimation smoothing interval of the receiving device of is unable to be determined, $x1=0$ and $x2=0$.

6. The method according to claim 1, wherein:
for a receiving device of an enhanced system, data sent between the two transmitting antenna ports of the each group is not limited by each other.

7. The method according to claim 1, wherein $e^{jw}=1$ or $-1$.

8. The method according to claim 1, wherein $a=b=1$.

9. The method according to claim 1, wherein $a^2+b^2=1$.

10. A device for sending reference signals (RSs) after transmitting antenna expansion, the device comprising:
a grouping unit, configured to group expanded transmitting antennas, wherein each group comprises two transmitting antenna ports; and
a sending unit, configured to send RSs in two adjacent RS periods 2T, wherein the RSs sent by the two transmitting antenna ports of the each group are $[a*s1, b*s1*e^{jw}]$ respectively in a first period T and $[a*s2, -b*s2*e^{jw}]$ respectively in a second period T, a and b are real numbers greater than or equal to 0, and s1 and s2 are RSs sent by a transmitting antenna before expansion in the first period T and the second period T respectively.

11. The device according to claim 10, further comprising:
a first data sending unit, configured to send data, wherein the data sent by the two transmitting antenna ports of the each group is $[a*d1, x1]$ respectively in the first period T and $[a*d2, x2]$ respectively in the second period T, and d1 and d2 are data sent by the transmitting antenna before expansion in the first period T and the second period T respectively.

12. The device according to claim 11, further comprising:
if a channel estimation smoothing interval of the receiving device is the RS period T, $x1=b*d1*e^{jw}$ and $x2=-b*d2*e^{jw}$.

13. The device according to claim 11, further comprising:
if a channel estimation smoothing interval of the receiving device is greater than or equal to the two RS periods 2T, $x1=0$ and $x2=0$.

14. The device according to claim 11, further comprising:
if a channel estimation smoothing interval of the receiving device is unable to be determined, $x1=0$ and $x2=0$.

15. The device according to claim 10, further comprising:
a second data sending unit, configured to send data, wherein the data sent between the two transmitting antenna ports of the each group is not limited by each other.

16. The device according to claim 10, wherein $e^{jw}=1$ or $-1$.

17. The method according to claim 10, wherein $a=b=1$.

18. The method according to claim 10, wherein $a^2+b^2=1$.

19. A system for sending reference signals (RSs) after transmitting antenna expansion, the system comprising a sending device and a receiving device, wherein the sending device comprises:

a grouping unit, configured to group expanded transmitting antennas, wherein each group comprises two transmitting antenna ports; and a sending unit, configured to send RSs in two adjacent RS periods 2T, wherein the RSs sent by the two transmitting antenna ports of the each group are [a*s1, b*s1*$e^{jw}$] respectively in a first period T and [a*s2, −b*s2*$e^{jw}$] respectively in a second period T, a and b are real numbers greater than or equal to 0, and s1 and s2 are RSs sent by a transmitting antenna before expansion in the first period T and the second period T respectively.

20. The system according to claim 19, wherein:

the sending device further comprises: a first data sending unit, configured to send data, wherein the data sent by the two transmitting antenna ports of the each group is [a*d1, x1] respectively in the first period T and [a*d2, x2] respectively in the second period T, and d1 and d2 are data sent by the transmitting antenna before expansion in the first period T and the second period T respectively.

* * * * *